United States Patent [19]

Odor

[11] Patent Number: 4,690,592

[45] Date of Patent: Sep. 1, 1987

[54] STABILIZING ATTACHMENT FOR BORING HEAD

[75] Inventor: Elbert P. Odor, Tampa, Fla.

[73] Assignee: Westinghouse Electric Corp., Pittsburgh, Pa.

[21] Appl. No.: 534,238

[22] Filed: Sep. 21, 1983

[51] Int. Cl.⁴ .............................................. B23B 3/26
[52] U.S. Cl. ...................................... 408/1 R; 82/46; 408/78; 408/80; 409/179
[58] Field of Search ............... 409/178, 179, 204, 205, 409/209, 230, 231, 235, 236; 408/79, 80, 87, 112, 113, 114, 81, 82, 83, 1 R; 82/2 E, 4 R, 4 C; 144/205

[56] References Cited

U.S. PATENT DOCUMENTS

| | | | |
|---|---|---|---|
| 1,745,207 | 1/1930 | Davis et al. | 408/709 X |
| 2,595,541 | 5/1952 | Riordan | 82/4 R |
| 2,747,948 | 5/1956 | Jergens | 408/79 X |
| 2,797,598 | 7/1957 | Labenz | 408/80 X |
| 2,814,920 | 7/1931 | Hartwell | 408/82 |
| 3,142,139 | 7/1964 | Mangum | 409/178 X |
| 3,999,452 | 12/1976 | Larsen | 408/80 X |
| 4,343,207 | 8/1982 | Paysinger | 82/4 R |
| 4,433,598 | 2/1984 | Murray | 82/2 E |
| 4,462,726 | 7/1984 | Silvey et al. | 408/79 X |
| 4,463,633 | 8/1984 | Arimsley | 408/209 X |
| 4,470,734 | 9/1984 | Miller | 409/175 |
| 4,483,222 | 11/1984 | Davis | 408/104 X |

FOREIGN PATENT DOCUMENTS 2826413 12/1979 Fed. Rep. of Germany ........ 408/78

Primary Examiner—Gil Weidenfeld
Assistant Examiner—Glenn L. Webb

[57] ABSTRACT

A stabilizing attachment for a boring head is provided. The attachment includes a clamp for engaging a rotatable head plate of the boring head, a pair of support arms extending axially of the annular clamping ring, and a transverse plate carried by the support arms at their outer ends. The transverse plate supports a shaft on which is mounted an anti-friction bearing, the outer race of which engages an opening in the wall of a pressure vessel. A bit carried by the head plate of the boring head moves in an annular path to cut a gasket seat about the opening. A method of cutting an annular groove in a wall, utilizing a stabilizing attachment for a boring head which engages in an opening in the wall.

15 Claims, 4 Drawing Figures

STABILIZING ATTACHMENT FOR BORING HEAD

BACKGROUND OF THE INVENTION

1. Field of the Invention

The present invention relates to apparatus for use in machining an annular groove in a wall.

2. Description of the Prior Art

There are a large number of pressure vessels presently in use, having walls of steel of substantial thickness. These pressure vessels are used in both steam generating plants and nuclear power plants, and are provided with three-inch thick walls in order to withstand the internal pressures, which are often in the range of 1,100–1,200 pounds per square inch.

It is often necessary to penetrate the shell or wall of such vessels, providing an opening so as to allow inspection of elements within the vessel. Following the penetration of the vessel wall by the making of an opening therein, the opening must be closed, and this is accomplished by providing a plate which is secured over the opening which has been made. It is necessary that a suitable gasket be provided between the plate and the vessel wall, and it has been found to be necessary to provide an annular groove about the opening, in which to position and seat the gasket. The machining of the gasket seat groove has presented a considerable problem, heretofore.

There was used in the providing of the gasket seat groove of annular configuration a tool having a bit, which was rotated about an axis. The bit was rotated by a boring head, driven by an electric motor. In order to stabilize the apparatus, and to provide against undesired movement of the bit, it was conventional to use a large mass, such as a very large motor. The motor was provided not only to rotate the input shaft of the boring head which carried the bit, but was made of extremely large size in order to provide a mass to stabilize the bit. Heretofore, the equipment provided in order to stabilize the bit, for forming the gasket seat groove, totaled as much as 6,000 pounds. Hence, the prior art constructions were cumbersome, heavy and expensive.

SUMMARY OF THE INVENTION

The present invention provides a stabilizing attachment for a boring head. The boring head includes an input shaft, gearing, and a rotatable head plate which supports a tool carrier and a bit, the latter rotatable in an annular path about the axis of the boring head. The stabilizing attachment includes a clamp in the form of a split ring, having a bolt arrangement for releasably clamping it to the rotatable head plate of the boring head. A pair of diametrically opposed arcuate arms extend forwardly of and perpendicularly to the clamp, and coaxially with the axis of the boring head. At their forward or outer ends, the support arms carry a transverse plate, which in turn carries an axially mounted shaft. On the shaft is a bearing having an inner race fixed to it, and an outer race rotatable with respect to the inner race. The outer race is engaged in an opening made in the vessel wall, so as to be non-rotatable with the opening; the boring head is supported by a conventional support apparatus secured electromagnetically to the vessel wall.

Among the objects of the present invention is the provision of a readily portable, lightweight stabilizing attachment for a boring head, and to provide such a stabilizing attachment which will enable a bit carried by the boring head to traverse an annular path with relatively great precision.

Another object is to provide a facile method for providing an annular gasket seat groove in a vessel wall.

Other objects of the present invention will be readily understood from the following specification and claims, and the appended drawings.

DESCRIPTION OF THE PREFERRED EMBODIMENT

Figure 1:
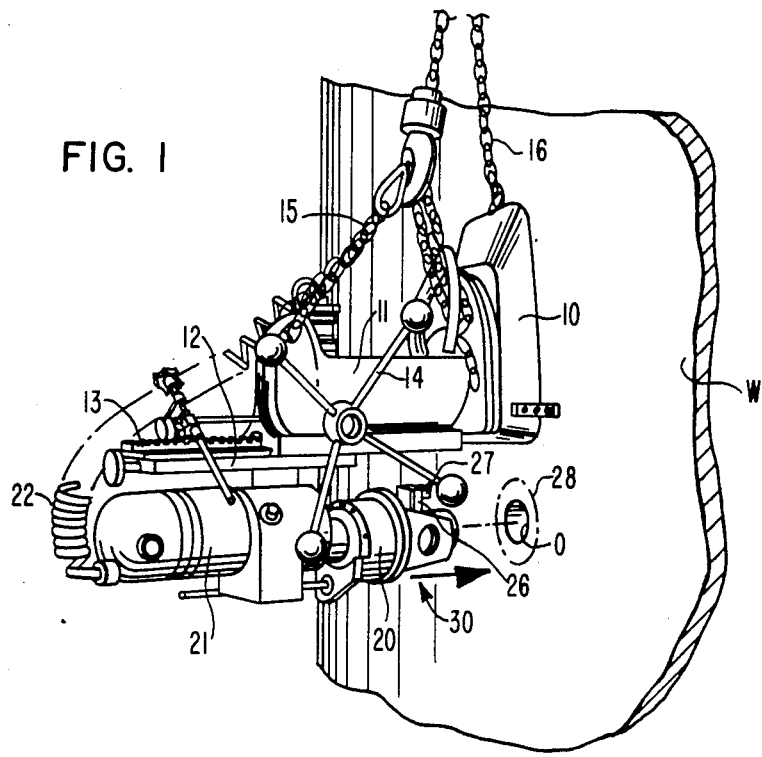
FIG. 1 is a perspective view of apparatus including a stabilizing attachment in accordance with the present invention attached to a boring head.

Referring now to the drawings, wherein like or corresponding reference numerals are used for like or corresponding parts throughout the several views, there is shown in FIG. 1 a wall W forming a part of a pressure vessel, and having an opening 0 therein. An electromagnet 10 has extending from it a carriage support 11, which supports a carriage 12 having thereon a rack 13. An advance wheel 14 is provided, which includes in known fashion, a gear (not shown) for engaging the rack 13 and thereby causing the carriage 12 to advance towards the wall W, or to retract from it. Connected to the carriage support 11 and electromagnet 10 are chains 15, 16 for supporting the apparatus when the electromagnet 10 is de-energized, and also for safety.

On the underside of the carriage 12 there is supported a boring head 20 having a drive motor 21 extending from it, motor 21 being supplied with energy through the conductor 22. Forwardly of the boring head 20 is the stabilizing attachment 30 in accordance with the present invention.

Figure 2:
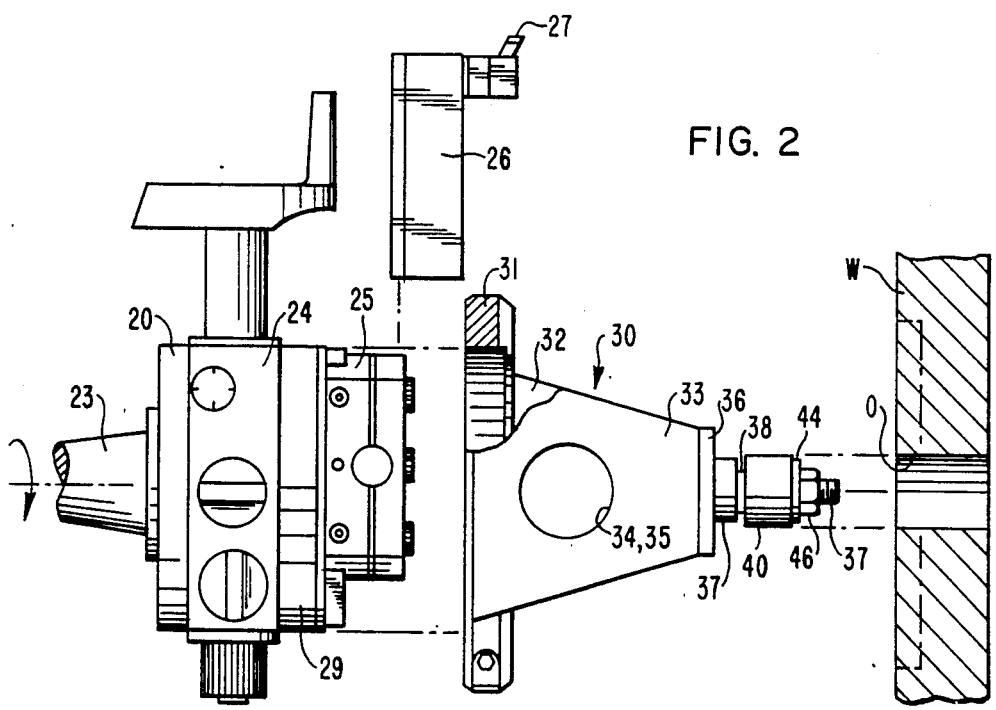
FIG. 2 is an elevational view, with parts in section, of the boring head and stabilizing attachment.

Referring to FIG. 2, there is shown the boring head 20, which is of known construction known as the D'Andrea facing or boring head, which includes a driven shaft 23, a stationary body 24, and a rotatable head plate 25 configured, in known fashion, to hold a conventional boring bar 26 having a bit 27 thereon. The bit 27 (see also FIG. 1) will be seen to be at a radius from the axis of boring head 20. Thus, the bit 27 will be positioned to machine an annular groove 28 in the wall W about and concentric with the opening O.

The stabilizing attachment 30 includes at its left or rear end a clamping ring 31 which is assembled to the boring head 20, engaging a land 29 thereon which is rotatable relative to the stationary body 24. Support arms 32 and 33 extend forwardly from the clamping ring 31, and have transverse openings 34, 35 therein. A transverse plate 36 extends between the outer ends of the support arms 32, 33 and carries a shaft 37 which extends axially of the stabilizing attachment 30 and of the boring head 20. The shaft 37 has an enlarged portion secured to the transverse plate 36; on shaft 37 are a spacer 38, an anti-friction bearing 40, a second spacer 44 and a retaining nut 46 threaded on the threaded outer end of shaft 37.

Figure 3:
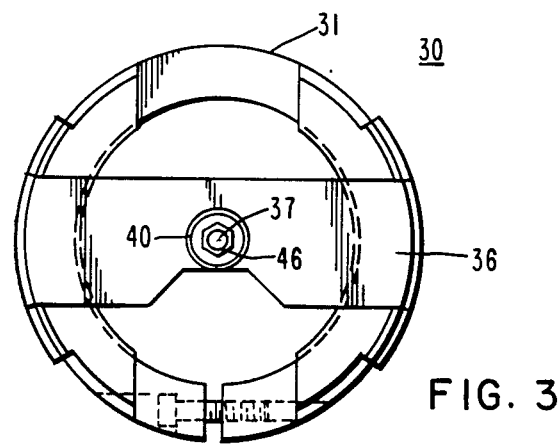
FIG. 3 is an end view of the stabilizing attachment, with parts broken away.

In FIG. 3, there may be seen the clamping ring 31, having at its bottom a split 51 between the opposed, spaced ends 52 and 53 of the clamping ring 31. A bolt 54 has its head in the end 53 of clamping ring 31, and extends into a threaded bore 55 in the spaced end 52 of clamping ring 31, so as to releasably clamp and engage the clamping ring 31 and the stabilizing attachment 30 onto the land 29 of the boring head 20. Also shown in FIG. 3 are the diametrically opposed arcuate support arms 32 and 33, and the transverse plate 36. The bearing 40 is shown, with parts of the spacer 44 removed, and will be seen to include an outer race 41, an inner race 42 and anti-friction elements 43.

Figure 4:
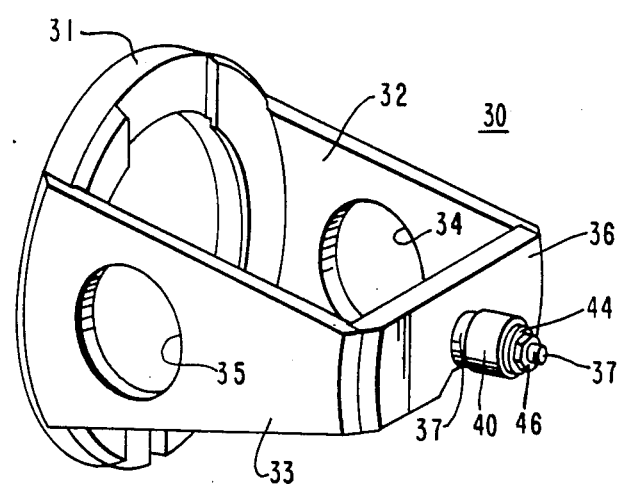
FIG. 4 is a perspective view of the stabilizing attachment.

FIG. 4 provides a perspective view of the stabilizing attachment 30, wherein there may be seen the clamping ring 31 and the forwardly extending, arcuate and parallel support arms 32 and 33 having the transverse openings 34 and 35 therein. The transverse plate 36 is also shown, as well as the shaft 37 and the bearing 40. The clamping ring 31, support arms 32 and 33 and transverse plate 36 provide, in substance, a chamber and it is within this chamber that there is received the rotatable head plate 25 of the boring head 20. The boring bar 26 will extend radially outwardly, between the support arms 32 and 33, as shown in FIG. 1.

In use, an access opening 0 is made in the wall W of the pressure vessel, and the outer race of the bearing 40 is positioned in the opening 0, in a tight, nonrotational fit. The entire assemblage, except for the stabilizing attachment 30, is then placed in position, utilizing the chains 15 and 16, and then the electromagnet 10 is energized to thereby support the assemblage. The advance wheel 14 is rotated in order to move the carriage 12 and the boring head 20 forwardly, so that the land 29 enters into the clamping ring 31. The bolt 54 is then rotated, so as to clamp the clamping ring 31, and thereby the entire stabilizing attachment 30, to the rotatable head plate 29 of the boring head 20. The boring bar 26 is then placed in position in the rotatable head plate 25, which is configured, in known fashion, to receive tool holder 26, with the bit 27 being at the desired radius to machine the annular groove 28 in the wall W. The various screws forming a part of the rotatable head plate 25 are then turned to secure the tool holder in position, access being had either through the space between the arms 32 and 33 and/or the openings 34 and 35 therein. The motor 21 is then energized, causing the driven shaft 23 to be rotated, thereby rotating the rotatable head 25, the land 29, the bit or tool 27 and the entire stabilizing attachment 30, except for the outer race 41 of bearing 40.

Due to the support of the boring head 30 from the carriage 12, carriage support 11, and electromagnet 10, on the one hand, and the bearing 40, shaft 37 and support arms 32 and 33, on the other hand, the bit 27 will follow a precise annular path, in order to machine a gasket seat groove 28 of great precision.

There has been provided a lightweight, inexpensive and readily transportable stabilizing attachment for a boring head, which will provide for the machining of an annular groove of great precision in a wall about an opening therein. There has also been provided an effective and reliable method for machining such an annular groove.

It will be obvious to one skilled in the art that various changes may be made without departure from the spirit of the invention, and therefore the invention is not limited to that shown in the drawings, and described in the specification but only as indicated in the appended claims.

I claim:

1. A stabilizing attachment for a boring head for machining an annular groove about an opening in a wall, the boring head having in axial alignment a driven shaft, a body stationary with respect to the wall and a rotatable head plate for supporting a tool holder and an orbiting bit, said attachment comprising:
    (a) means for releasably engaging the rotatable head plate of the boring head,
    (b) support means extending forwardly from said engaging means, said support means comprising at least two support arm means extending transversely from said engaging means and a transverse plate attached to the forward end of said support arm means, said arm means and plate providing a chamber for receiving said head plate, and said support arm means having an opening transversely thereof for passage therethrough of the tool holder carried by said rotatable head plate,
    (c) a shaft carried by said support means axially thereof, and
    (d) bearing means carried by said shaft having relatively rotatable parts, the relatively rotatable parts comprising an inner race and an outer race, the inner race being fixedly attached to said shaft and the outer race being adapted to engage the opening.

2. The stabilizing attachment of claim 1, said engaging means comprising a split ring, and bolt means for adjusting the diameter thereof.

3. The stabilizing attachment of claim 2, said engaging means comprising means defining an inwardly facing channel.

4. The stabilizing attachment of claim 1, said arm means comprising a pair of substantially parallel arms.

5. The stabilizing attachment of claim 4, at least one of said arms having an aperture therein.

6. The stabilizing attachment of claim 1, said arm means comprising at least one arm, said arm being arcuate in transverse cross-section and substantially concentric with an axis perpendicular to the median plane of said engaging means.

7. The stabilizing attachment of claim 6, said transverse plate carried by said arm, said shaft supported by said plate.

8. The stabilizing attachment of claim 1, said transverse plate carried by said arm means, said shaft supported by said plate.

9. A stabilizing attachment for a boring head for machining an annular path about an opening in a wall, the boring head having a body stationary with respect to the wall and a head plate rotatable about an axis for supporting a tool holder and an orbiting bit, said attachment comprising:
    (a) clamping means for releasably clamping the rotatable head plate of the boring head,
    (b) support arm means extending transversely of said clamping means and axially of said axis, said support arm means having an opening transversely thereof for passage therethrough of the tool holder carried by said rotatable head plate,
    (c) transverse plate means generally parallel to said clamping means carried by said support arm means remote from said clamping means, said transverse plate means and said support arm means providing a chamber for receiving said head plate, (d) bearing means comprising inner and outer relatively rotatable parts, said outer rotatable part being adapted to engage the opening, and (e) mounting means for mounting said bearing means to the stabilizing attachment comprising a shaft carried by said transverse plate means axially aligned with said axis and having said bearing means thereon.

10. The stabilizing attachment of claim 9, said support arm means having an opening transversely thereof for passage therethrough of a tool carried by said rotatable boring head.

11. The stabilizing attachment of claim 9, said support arm means comprising a pair of arcuate, substantially parallel support arms, said support arms being diametrically opposed.

12. The stabilizing attachment of claim 9, wherein said clamping means comprises a split ring, and belt means for adjusting the diameter of said split ring.

13. A method of machining an annular groove in a wall about an opening therein with a lightweight boring head having a body stationary with respect to the wall and a rotatable head plate, the stationary body being supported by a carriage, said method comprising:

(a) inserting a first part of a support into said opening in substantial engagement therewith, said support having said first part, a second part rotatable with respect to said first part, at least two support arm means, and a transverse plate connecting said second part to said support arm means, (b) positioning the carriage and the boring head supported thereby adjacent said opening and the support engaged therein, (c) connecting said second part of said support to the rotatable head plate of said boring head with an engaging means comprising a split ring and bolt means for adjusting the diameter of the split ring, the engaging means nonrotatably connecting the head plate to the support arm means, (d) securing a tool holder to the head plate between the engaging means and the transverse plate of the support, the tool holder being positioned to maintain a bit at a predetermined radius, the predetermined radius being greater than the radius of the first part of the support, and (e) rotating the head plate of the boring head, thereby rotating the attached tool holder and causing said bit to circumscribe an annular path about said opening.

14. The method of claim 13, wherein said support engaging said opening comprises a bearing having a first outer race engaging the walls of said opening, and a second inner race rotatable with respect to said first outer race.

15. The method of claim 14, and further comprising the step of advancing said bit.

* * * * *